(12) United States Patent
Wakisaka et al.

(10) Patent No.: US 11,522,606 B2
(45) Date of Patent: Dec. 6, 2022

(54) PHASE MEASUREMENT METHOD, SIGNAL PROCESSING DEVICE, AND PROGRAM

(71) Applicant: NIPPON TELEGRAPH AND TELEPHONE CORPORATION, Tokyo (JP)

(72) Inventors: Yoshifumi Wakisaka, Musashino (JP); Daisuke Iida, Musashino (JP); Keiji Okamoto, Musashino (JP); Hiroyuki Oshida, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/285,719

(22) PCT Filed: Nov. 14, 2019

(86) PCT No.: PCT/JP2019/044621
§ 371 (c)(1),
(2) Date: Apr. 15, 2021

(87) PCT Pub. No.: WO2020/110739
PCT Pub. Date: Jun. 4, 2020

(65) Prior Publication Data
US 2022/0006521 A1      Jan. 6, 2022

(30) Foreign Application Priority Data

Nov. 29, 2018   (JP) .............................. JP2018-224110

(51) Int. Cl.
*H04B 10/07* (2013.01)
*H04B 10/071* (2013.01)

(52) U.S. Cl.
CPC .................. *H04B 10/071* (2013.01)

(58) Field of Classification Search
CPC ........ H04B 10/071; G01M 11/00; G01J 11/00
See application file for complete search history.

(56) References Cited

U.S. PATENT DOCUMENTS

| 5,838,737 A * | 11/1998 | Yamaguchi ............. H04L 1/206 329/304 |
| 2007/0092018 A1 * | 4/2007 | Fonseka ................ H04L 1/0054 375/265 |

(Continued)

OTHER PUBLICATIONS

Ali Masoudi, T. P. Newson, "Contributed Review: Distributed optical fibre dynamic strain sensing", Review of Scientific Instruments, vol. 87, pp. 011501 (2016).

(Continued)

*Primary Examiner* — Dzung D Tran
(74) *Attorney, Agent, or Firm* — Harness, Dickey & Pierce, P.L.C.

(57) ABSTRACT

It is an object to enable offline measurement with a high SN ratio of the phase of scattered light of an optical fiber to be measured in an optical receiving system for real-time measurement (direct measurement). The phase measurement method according to the present invention performs coherent detection of scattered light using a 90-degree optical hybrid, obtains an estimated quadrature component value by averaging a measured quadrature component value that is directly measured and a calculated quadrature component value obtained by Hilbert transforming a measured in-phase component value that is directly measured, obtains an estimated in-phase component value by averaging the measured in-phase component value and a calculated in-phase component value obtained by inverse Hilbert transforming the measured quadrature component value, and calculates the phase of scattered light based on the estimated quadrature component value and the estimated in-phase component value.

5 Claims, 5 Drawing Sheets

(56) References Cited

U.S. PATENT DOCUMENTS

| | | | | |
|---|---|---|---|---|
| 2009/0225301 A1* | 9/2009 | Morofke | .................. | G01P 5/26 |
| | | | | 356/28.5 |
| 2010/0283659 A1* | 11/2010 | Huggett | ................. | G01S 7/285 |
| | | | | 342/194 |
| 2012/0067118 A1* | 3/2012 | Hartog | .................... | G02B 6/10 |
| | | | | 73/152.16 |

OTHER PUBLICATIONS

Xinyu Fan et al., "Distributed Fiber-Optic Vibration Sensing Based on Phase Extraction From Optical Reflectometry", Journal of Lightwave Technology, vol. 35, No. 16 pp. 3281 (2017).

Zinan Wang et al., "Coherent (ϕ-OTDR based on I/Q demodulation and homodyne detection", Optics Express, vol. 24, No. 2, pp. 853 (2016).

Yoshifumi Wakisaka et al. "Noise reduction in I/Q demodulation-based coherent phase OTDR method by Hilbert transform", IEICE General Conference 2019 with English translation thereof.

\* cited by examiner

PHASE MEASUREMENT METHOD, SIGNAL PROCESSING DEVICE, AND PROGRAM

CROSS-REFERENCE TO RELATED APPLICATIONS

This application is a 371 U.S. National Phase of International Application No. PCT/JP2019/044621, filed Nov. 14, 2019, which claims priority to Japanese Patent Application No. 2018-224110, filed Nov. 29, 2018. The entire disclosures of the above applications are incorporated herein by reference.

TECHNICAL FIELD

The present disclosure relates to a phase measurement method, a signal processing apparatus, and a program for calculating the phase of scattered light from a fiber to be measured.

BACKGROUND ART

A phase OTDR method is known as a means for measuring a physical vibration applied to an optical fiber in a distributed manner in a longitudinal direction of the optical fiber (see, for example, Non Patent Literature 1).

In the phase OTDR, pulsed light is incident on an optical fiber to be measured and the phase of scattered light at the time t when the pulsed light is incident is measured in a distributed manner in the longitudinal direction of the optical fiber. That is, the phase $\theta(l, t)$ of scattered light is measured with respect to a distance $l$ from a far end of the optical fiber. By repeatedly injecting the pulsed light into the optical fiber to be measured at time intervals T, a change with time $\theta(l, nT)$ of the phase of scattered light at time $t=nT$ where n is an integer is measured for each point in the longitudinal direction of the optical fiber to be measured. It is known that the magnitude of a physical vibration applied to a section from the distance $l$ to a distance $l+\delta l$ at each time nT is proportional to the difference $\delta\theta(l, nT)$ between the phase $\theta(l+\delta l, nT)$ at the distance $l+\delta l$ and the phase $\theta(l, nT)$ at the distance $l$. That is, the magnitude of the physical vibration with reference to time 0 is given as follows.

[Formula 1]

$$(\text{Magnitude of vibration}) \propto \delta\theta(l, nT) - \delta\theta(l, 0) = [\theta(l + \delta l, nT) - \theta(l, nT)] - [\theta(l + \delta l, 0) - \theta(l, 0)] = [\theta(l + \delta l, nT) - \theta(l + \delta l, 0)] - [\theta(l, nT) - \theta(l, 0)] \quad (1)$$

There are a plurality of phase OTDR configurations for measuring the phase $\theta(l, nT)$, among which a coherent OTDR (C-OTDR) that uses coherent detection with a mixture of signal light scattered from an optical fiber to be measured and local light can perform measurement with a high SN ratio.

Mechanisms for performing coherent detection and calculating the phase are subdivided into two types, a software-based processing mechanism using a Hilbert transform and a hardware-based processing mechanism using a 90-degree optical hybrid.

In the software-based processing mechanism using the Hilbert transform, local light and signal light scattered from an optical fiber to be measured are incident on two inputs of a 50:50 coupler having the two inputs and two outputs, respectively, and light beams emitted from the two outputs are detected through balanced detection (see, for example, Non Patent Literature 2).

Assuming that the detected signal is an in-phase component $I(l, nT)$, the entire in-phase component is Hilbert transformed to calculate a quadrature component $Q(l, nT)$. That is, the quadrature component $Q(l, nT)$ is calculated as follows.

[Formula 2]

$$Q(l,nT)=HT_l[I(l,nT)] \quad (2)$$

Here, HT[*] is defined as a Hilbert operator that delays each frequency component of * by 90 degrees. The subscript of the operator represents a variable with respect to which the operation is performed. For example, $HT_x[\cos(kx)\sin(\omega t)]$ gives $\sin(kx)\sin(\omega t)$.

A calculated phase value $\theta_{cal}(l, nT)$ is calculated as the angle of a vector $(x, y)=(I(l, nT), Q(l, nT))$ on an xy plane with the in-phase component on the x axis and the quadrature component on the y axis. That is, the calculated phase value $\theta_{cal}(l, nT)$ is calculated as follows.

[Formula 3]

$$\theta_{cal}(l, nT) = \text{Arctan}\left[\frac{Q(l, nT)}{I(l, nT)}\right] \quad (3)$$

However, there is an uncertainty of $2m\pi$ in the calculated phase value $\theta_{cal}(l, nT)$ because the output value of a four-quadrant inverse tangent operator Arctan is in a range of $(-\pi, \pi]$ in radians and all phase values of $2m\pi+\theta(l, nT)$ correspond to the same vector direction on the xy plane, where m is any integer. Thus, signal processing such as phase unwrapping is further performed as a method of more accurately evaluating $\theta(l, nT)$. In typical phase unwrapping, if a value given by Expression (4b) where p is any integer is greater than $\pi$ radians for an unwrapped phase given by Expression (4a), an appropriate integer q which makes a value given by Expression (4c) less than or equal to $\pi$ radians is selected to calculate an unwrapped phase of Expression (4d) using Equation (4) as follows.

[Formula 4a]

$$\theta_{cal}^{unwrap} \quad (4a)$$

[Formula 4b]

$$|\theta_{cal}(l,(p+1)T)-\theta_{cal}^{unwrap}(l,pT)| \quad (4b)$$

[Formula 4c]

$$|\theta_{cal}(l,(p+1)T)+2\pi q-\theta_{cal}^{unwrap}(l,pT)| \quad (4c)$$

[Formula 4d]

$$\theta_{cal}^{unwrap}(l,(p+1)T) \quad (4d)$$

[Formula 4]

$$\theta_{cal}^{unwrap}(l,(p+1)T)=\theta_{cal}(l,(p+1)T)+2\pi q \quad (4)$$

The superscript unwrap indicates that the phase has been unwrapped.

In the hardware-based processing mechanism using the 90-degree optical hybrid, local light and signal light scattered from an optical fiber to be measured are incident on a component which is called a 90-degree optical hybrid, and as outputs from two balanced detectors, an in-phase component $I(l, nT)$ and a quadrature component $Q(l, nT)$ are directly acquired (see, for example, Non Patent Literature 3). Subsequent phase calculation is the same as the above calculation.

The hardware-based processing mechanism using the 90-degree optical hybrid is used for applications such as not only offline processing but also real-time measurement because the in-phase component I(l, nT) and the quadrature component Q(l, nT) can be measured directly and simultaneously.

CITATION LIST

Non Patent Literature

Non Patent Literature 1: Ali. Masoudi, T. P. Newson, "Contributed Rview: Distributed optical fibre dynamic strain sensing", Review of Scientific Instruments, vol. 87, pp 011501 (2016)
Non Patent Literature 2: Xinyu Fan et al., "Distributed Fiber-Optic Vibration Sensing Based on Phase Extraction From Optical Reflectometry", Journal of Lightwave Technology, vol. 35, no. 16 pp 3281 (2017)
Non Patent Literature 3: Zinan Wang et al., "Coherent Φ-OTDR based on I/Q demodulation and homodyne detection", Optics Express, vol. 24, no. 2, pp 853 (2016)

SUMMARY OF THE INVENTION

Technical Problem

Compared to the software-based processing mechanism using the Hilbert transform, the hardware-based processing mechanism using the 90-degree optical hybrid reduces the intensity of light incident on the balanced detector, which increases the deterioration of the SN ratio. This increases the uncertainty of the calculated phase and deteriorates the sensitivity of phase measurement. In addition, due to the increase in the uncertainty of the calculated phase, the number of points where the integer q is incorrectly selected increases in the unwrapping processing shown in Equation (4) and phase value differences of $2\pi$ or more which do not actually exist occur across the points where the integer q is incorrectly selected. Such phase value differences lead to incorrect recognition that a large physical force has been applied to the optical fiber when the magnitude of the vibration is calculated using Expression (1). That is, the hardware-based processing mechanism using the 90-degree optical hybrid has a problem in the SN ratio although it is necessary to use the hardware-based processing mechanism for performing real-time measurement in addition to offline processing.

An object of the present invention to solve the above problems is to provide a phase measurement method, a signal processing apparatus, and a program that enable both real-time measurement and offline measurement with a high SN ratio of the phase of scattered light from an optical fiber.

Means for Solving the Problem

In order to achieve the above object, the phase measurement method and the signal processing apparatus according to the present invention perform coherent detection of scattered light using a 90-degree optical hybrid, obtain an estimated quadrature component value by averaging a measured quadrature component value that is directly measured and a calculated quadrature component value obtained by Hilbert transforming a measured in-phase component value that is directly measured, obtain an estimated in-phase component value by averaging the measured in-phase component value and a calculated in-phase component value obtained by inverse Hilbert transforming the measured quadrature component value, and calculate the phase of scattered light based on the estimated quadrature component value and the estimated in-phase component value.

Specifically, the phase measuring method according to the present invention is a phase measurement method for measuring a phase of scattered light from a fiber to be measured, the phase measurement method including acquiring a measured in-phase component value and a measured quadrature component value of a signal obtained by coherently detecting the scattered light through a 90-degree optical hybrid, Hilbert transforming the measured in-phase component value to acquire a calculated quadrature component value and inverse Hilbert transforming the measured quadrature component value to acquire a calculated in-phase component value, averaging the measured in-phase component value and the calculated in-phase component value to acquire an estimated in-phase component value and averaging the measured quadrature component value and the calculated quadrature component value to acquire an estimated quadrature component value, and calculating a four-quadrant inverse tangent of a quotient obtained by dividing the estimated quadrature component value by the estimated in-phase component value.

Further, the signal processing apparatus according to the present invention includes a signal input unit that receives, as inputs, a measured in-phase component value and a measured quadrature component value of a signal obtained by coherently detecting scattered light from a fiber to be measured through a 90-degree optical hybrid, a transform unit that Hilbert transforms the measured in-phase component value to acquire a calculated quadrature component value and inverse Hilbert transforms the measured quadrature component value to acquire a calculated in-phase component value, an estimation unit that averages the measured in-phase component value and the calculated in-phase component value to acquire an estimated in-phase component value and averages the measured quadrature component value and the calculated quadrature component value to acquire an estimated quadrature component value, and a calculation unit that calculates a four-quadrant inverse tangent of a quotient obtained by dividing the estimated quadrature component value by the estimated in-phase component value.

By calculating the phase of scattered light using the estimated quadrature component value and the estimated in-phase component value as described above, it is possible to reduce the variation of the measured value to $1/\sqrt{2}$. This can reduce the SN ratio of offline measurement. Real-time measurement is also possible because the 90-degree hybrid is used. Therefore, the present invention can provide a phase measurement method and a signal processing apparatus that enable both real-time measurement and offline measurement with a high SN ratio of the phase of scattered light from an optical fiber.

The phase measurement method according to the present invention is characterized by further including performing phase unwrapping processing on the four-quadrant inverse tangent. The signal processing apparatus according to the present invention is characterized by further including a phase unwrapping processing unit that performs phase unwrapping processing on the four-quadrant inverse tangent.

Because the SN ratio of the offline measurement can be reduced, a phase with less uncertainty can be used in the phase unwrapping processing and the probability of occurrence of points where the integer q is incorrectly selected can be reduced.

The present invention provides a program for causing a computer to operate as the signal processing apparatus. The signal processing apparatus of the present invention can also be implemented by the computer and the program and the program can be recorded on a recording medium or provided through a network.

Effects of the Invention

The present invention can provide a phase measurement method, a signal processing apparatus, and a program that enable both real-time measurement and offline measurement with a high SN ratio of the phase of scattered light from an optical fiber.

DESCRIPTION OF EMBODIMENTS

Embodiments of the present invention will be described with reference to the accompanying drawings. The embodiments described below are examples of the present invention and the present invention is not limited to the embodiments described below. In the present specification and the drawings, components with the same reference signs indicate the same components.

Phase Measurement Method for Scattered Light

Figure 1:
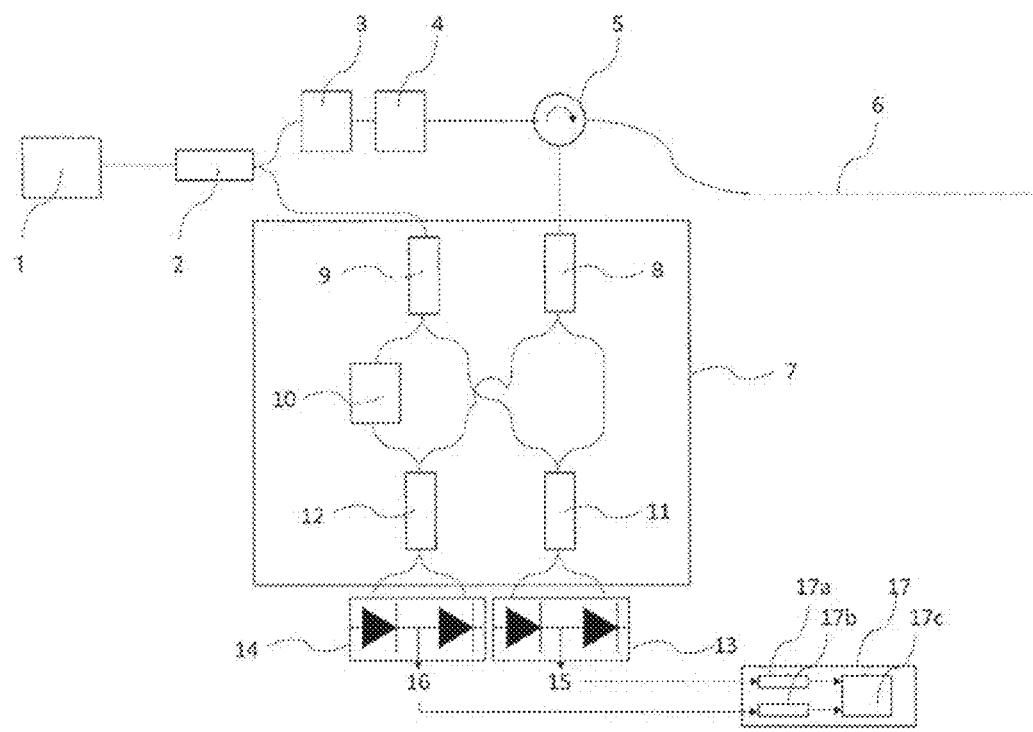
FIG. 1 is a diagram illustrating a C-OTDR including a signal processing apparatus according to the present invention.

FIG. 1 is a diagram illustrating a configuration of a C-OTDR which uses a hardware-based processing mechanism using a 90-degree optical hybrid for a receiving system.

Continuous light of a single wavelength is emitted from a continuous wave (CW) light source 1 and is split into local light and probe light by a coupler 2. The probe light is pulsed by an intensity modulator 3 and is changed in frequency by a frequency shifter 4. Any type of the intensity modulator or the frequency shifter may be used, a plurality of intensity modulators or frequency shifters may be provided, and a device into which the functions of the intensity modulator and the frequency shifter are integrated may also be used. For example, pulsing and frequency shifting using an LN modulator or an AO modulator is possible. A configuration in which the amount of frequency shift by the frequency shifter is zero, that is, there is no frequency shifter, may also be used. The pulsed probe light is incident on an optical fiber to be measured 6 via a circulator 5. Light scattered at each point in the longitudinal direction of the optical fiber 6 returns to the circulator 5 as backscattered light and is incident on one input of a 90-degree optical hybrid 7. The local light obtained through splitting by the coupler 2 is incident on another input of the 90-degree optical hybrid 7.

The 90-degree optical hybrid may have any internal configuration as long as it has the functionality of the 90-degree optical hybrid. An exemplary configuration is illustrated in FIG. 1. The backscattered light is incident on a coupler 8 having a split ratio of 50:50 and the split beams of the scattered light are incident on an input of a coupler 12 having a split ratio of 50:50 and an input of a coupler 11 having a 50:50 ratio. The local light is incident on a coupler 9 having a split ratio of 50:50 and one of the two split beams of the local light is directly incident on an input of the coupler 11. The other of the two split beams of the local light is incident on an input of the coupler 12 after being phase-shifted by a phase shifter 10 which shifts the phase by $\pi/2$ at the wavelength of the local light. A balanced detector 13 detects two outputs of the coupler 11 to acquire an electrical signal 15 which is an in-phase component. A balanced detector 14 detects two outputs of the coupler 12 to acquire an electrical signal 16 which is a quadrature component. The electrical signals 15 and 16 are sent to a signal processing apparatus 17 that includes an AD conversion functional element 17a and an AD conversion functional element 17b, each of which can sample the frequency band of a signal without aliasing. In the signal processing apparatus 17, a signal processing unit 17c calculates a phase based on digitized signals of the in-phase and quadrature components respectively output from the AD conversion functional elements 17a and 17b.

The signal 15 is a measured value $I_{measure}(l, nT)$ which corresponds to a noise-free in-phase component $I(l, nT)$ with noise added. The signal 16 is a measured value $Q_{measure}(l, nT)$ which corresponds to a noise-free quadrature component $Q(l, nT)$ with noise added. That is, when $N_I$ and $N_Q$ are noise superimposed on the in-phase and quadrature components respectively, $I_{measure}(l, nT)$ and $Q_{measure}(l, nT)$ are given as follows.

[Formula 5]

$$I_{measure}(l,nT)=I(l,nT)+N_I(l,nT) \quad (5)$$

[Formula 6]

$$Q_{measure}(l,nT)=Q(l,nT)+N_Q(l,nT) \quad (6)$$

Here, because the in-phase and quadrature components are detected by the separate balanced detectors, $N_I$ and $N_Q$ are waveforms that are independent of each other and not correlated with each other.

The signal processing apparatus 17 calculates the phase of the scattered light from the measured in-phase and quadrature components as follows

[Formula 7]

$$\theta_{cal}(l, nT) = \text{Arctan}\left[\frac{Q_{measure}(l, nT)}{I_{measure}(l, nT)}\right] = \text{Arctan}\left[\frac{Q(l, nT) + N_Q(l, nT)}{I(l, nT) + N_I(l, nT)}\right] \quad (7)$$

Presence of the noise $N_I$ and $N_Q$ causes uncertainty at a position pointed to by the vector (x, y) of Equation (7a) on the xy plane with the in-phase component on the x axis and the quadrature component on the y axis and also causes uncertainty in the phase which corresponds to the direction indicated by the vector.

[Formula 7a]

$$(x,y) = (I_{measure}(l,nT), Q_{measure}(l,nT)) \quad (7a)$$

Figure 2:
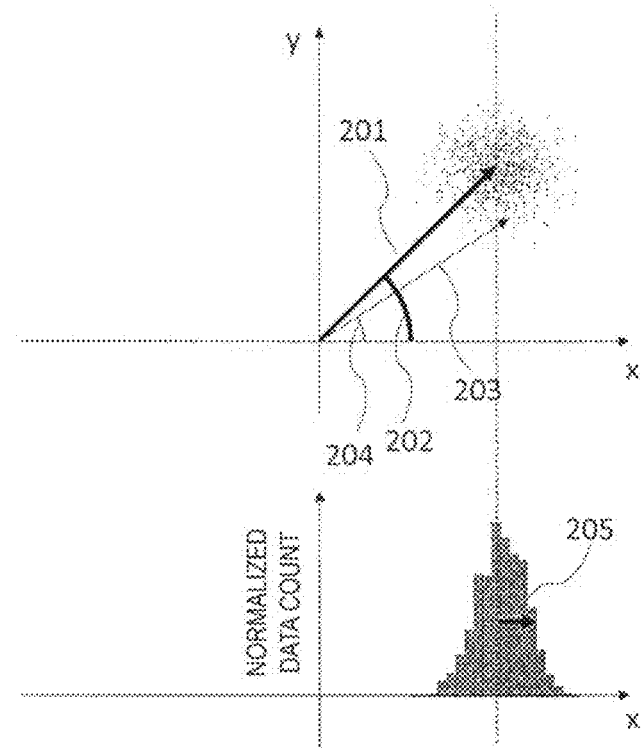
FIG. 2 is a diagram illustrating a phase calculation result of scattered light obtained through a method of the related art.

For example, if there is no noise, the calculated phase value $\theta_{cal}(l, nT)$ does not change with time and has a constant value for each l in a state where no vibration is applied to the optical fiber. However, if there is noise, the calculated phase value $\theta_{cal}(l, nT)$ changes with time for each l even when no vibration is applied to the optical fiber. This situation is illustrated in FIG. 2. When a vector at a certain position $l_0$ shown in Expression (7b) is plotted on the xy plane, Equation (7c) indicated by the vector 201 is always constant, and the angle 202 of the vector 201 also does not change with time if there is no noise.

[Formula 7b]

$$(I_{measure}(l_0, nT), Q_{measure}(l_0, nT)) \quad (7b)$$

[Formula 7c]

$$(x,y) = (I(l_0, nT), Q(l_0, nT)) \quad (7c)$$

However, because noise is actually present, a vector having in-phase and quadrature components at each time, like a vector 203, differs from the vector 201 and its angle 204 also differs from the angle 202. Therefore, vectors having actually measured values vary around the vector 201. The degree of variation can be evaluated using a standard deviation of measured values in each axial direction. For example, in the direction of the x axis, there is uncertainty corresponding to a standard deviation $\sigma(N_I)$ of noise $N_I$ indicated by 205 due to the variation of the x components of measured values. For coherent detection, the intensity of local light is sufficiently increased such that shot noise becomes dominant and the noise distribution can be approximated by a normal distribution. Because the intensities of light beams incident on the two balanced detectors 13 and 14 in FIG. 1 can be regarded as about the same, the standard deviations of the noise $N_I$ and $N_Q$ can also be regarded as having the same magnitude and the uncertainty forms a circle centered on the vector 201. Even when noise posterior to an electric stage such as thermal noise of a PD cannot be ignored, noise characteristics of the two balanced detectors 13 and 14 can be regarded as the same, such that the uncertainty may be considered to be a circle centered on the vector 201.

First Embodiment

A method for calculating the phase with less uncertainty than the phase calculated using Equation (7) using the acquired $I_{measure}(l, nT)$ and $Q_{measure}(l, nT)$ will be described below.

Figure 6:
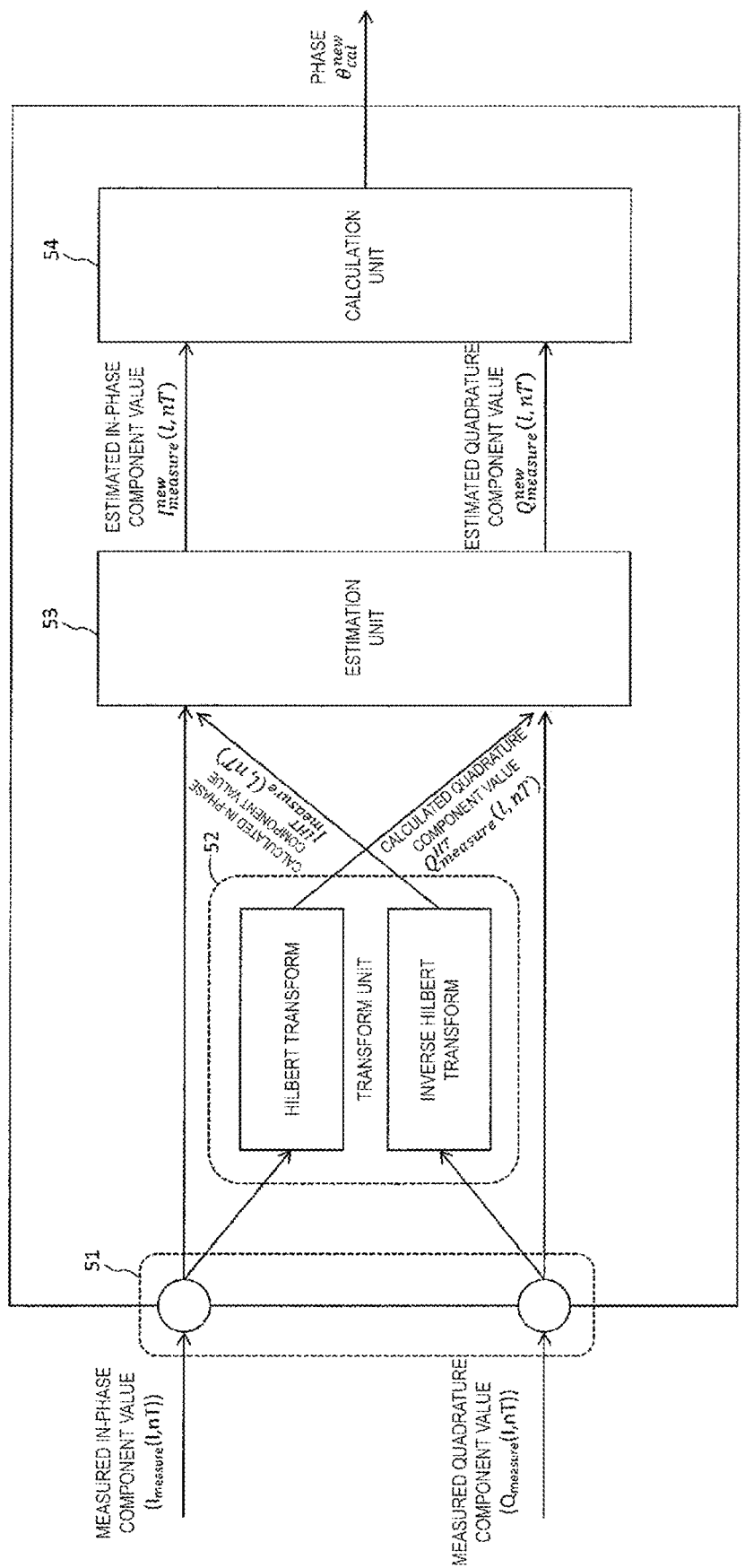
FIG. 6 is a diagram illustrating the signal processing apparatus according to the present invention.

FIG. 6 is a diagram illustrating the signal processing unit 17c of the present embodiment. That is, in the present embodiment, the signal processing unit 17c of FIG. 1 includes a signal input unit 51 that receives, as inputs, a measured in-phase component value and a measured quadrature component value of a signal obtained by coherently detecting scattered light from a fiber to be measured 6 through a 90-degree optical hybrid 7, a transform unit 52 that Hilbert transforms the measured in-phase component value to acquire a calculated quadrature component value and inverse Hilbert transforms the measured quadrature component value to acquire a calculated in-phase component value, an estimation unit 53 that averages the measured in-phase component value and the calculated in-phase component value to acquire an estimated in-phase component value and averages the measured quadrature component value and the calculated quadrature component value to acquire an estimated quadrature component value, and a calculation unit 54 that calculates a four-quadrant inverse tangent of a quotient obtained by dividing the estimated quadrature component value by the estimated in-phase component value. The signal processing unit 17c may further include a phase unwrapping processing unit that performs phase unwrapping processing on the four-quadrant inverse tangent.

Figure 7:
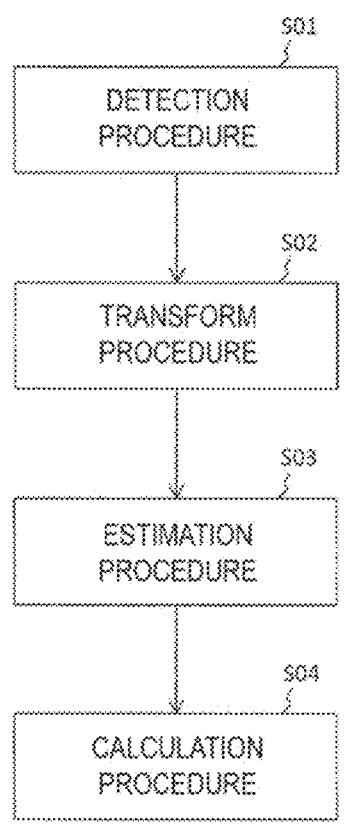
FIG. 7 is a flowchart illustrating the phase measurement method according to the present invention.

FIG. 7 is a diagram illustrating a method of measuring the phase of scattered light from the optical fiber to be measured 6 by a C-OTDR including the signal processing unit 17c of the present embodiment. This method is a phase measurement method for measuring a phase of scattered light from the fiber to be measured 6, the phase measurement method including a detection procedure S01 of acquiring a measured in-phase component value and a measured quadrature component value of a signal obtained by coherently detecting the scattered light through a 90-degree optical hybrid 7, a transform procedure S02 of Hilbert transforming the measured in-phase component value to acquire a calculated quadrature component value and inverse Hilbert transforming the measured quadrature component value to acquire a calculated in-phase component value, an estimation procedure S03 of averaging the measured in-phase component value and the calculated in-phase component value to acquire an estimated in-phase component value and averaging the measured quadrature component value and the calculated quadrature component value to acquire an estimated quadrature component value, and a calculation procedure S04 of calculating a four-quadrant inverse tangent of a quotient obtained by dividing the estimated quadrature component value by the estimated in-phase component value.

The phase measurement method may further include a phase unwrapping processing procedure of performing phase unwrapping processing on the four-quadrant inverse tangent.

The transform unit 52 performs the transform procedure S02 as follows. The transform unit 52 Hilbert transforms the measured in-phase component value $I_{measure}(l, nT)$ with respect to l to obtain a calculated quadrature component value of Expression (8a).

[Formula 8a]

$$Q_{measure}(l, nT) \quad (8a)$$

The calculated quadrature component value can be expanded as follows.

[Formula 8]

$$\begin{aligned} Q_{measure}^{HT}(l, nT) &= HT_l[I_{measure}(l, nT)] \\ &= HT_l[I(l, nT)] + HT_l[N_I(l, nT)] \\ &= Q(l, nT) + HT_l[N_I(l, nT)] \end{aligned} \quad (8)$$

In Equation (8), it is assumed that the Hilbert transform $HT_l[I(l, nT)]$ of the in-phase component without noise matches the quadrature component $Q(l, nT)$ obtained when there is no noise. However, actually, it is necessary to consider a calculation error due to the Hilbert transform. The Hilbert transform does not cause an error due to aliasing, but causes an error due to calculation with the signal being cut into a finite interval. In addition, the transfer function of the Hilbert transform exhibits an infinite response because it is discontinuous at the position where the frequency is zero, but in actual calculation, causes an error due to approximating the infinite response by a finite response.

However, such errors can be made sufficiently small as described below. First, the shape of the carrier envelope of the probe light incident on the fiber to be measured 6 can be approximated by a rectangle. In this case, the scattered light from the fiber to be measured 6 becomes a signal with a time length of at most about 2 L/c, where the length of the fiber to be measured 6 is L and the speed of light in the fiber is c. Thus, the error that occurs when the length for measuring the signal is not sufficient can be made negligible by measuring the scattered light for a time longer than or equal to 2 L/c. In addition, the error due to approximating the response can be made sufficiently small compared to noise by making the finite response (FIR) used for processing sufficiently long or by performing processing equivalent to this.

In the Hilbert transform of the actual signal processing apparatus 17, the error due to the Hilbert transform can be made negligible compared to noise by making the signal sufficiently long and making the FIR used for the processing sufficiently long or by performing processing equivalent to this.

The estimation unit 53 performs the estimation procedure S03 as follows. The estimation unit 53 calculates an average value of the calculated quadrature component value of Expression (8a) and the actually measured quadrature component value $Q_{measure}(l, nT)$ using Equation (9) to obtain an estimated quadrature component value.

[Formula 9]

$$Q^{new}_{measure}(l, nT) = \qquad (9)$$

$$Q(l, nT) + \frac{N_Q(l, nT) + HT_l[N_I(l, nT)]}{2} = Q(l, nT) + N^{new}_Q(l, nT)$$

Because $N_I$ and $N_Q$ are waveforms that are independent of each other and not correlated with each other, $N_Q$ and $HT_l[N_I]$ are also waveforms that are independent of each other and not correlated with each other. Thus, the standard deviation (Expression (9b)) of noise (Expression (9a)) which is given as the average of $N_Q$ and $HT_l[N_I]$ has a magnitude of about $\sigma/\sqrt{2}$, where the standard deviations of both $N_I$ and $N_Q$ are $\sigma$.

[Formula 9a]

$$N_Q^{new} \qquad (9a)$$

[Formula 9b]

$$\sigma(N_Q^{new}) \qquad (9b)$$

The transform unit 52 also performs the transform procedure S02 for the quadrature component.
The transform unit 52 performs an inverse Hilbert transform on the measured quadrature component value $Q_{measure}(l, nT)$ with respect to l to obtain a calculated in-phase component value of Expression (10a).

[Formula 10a]

$$I_{measure}^{IHT}(l, nT) \qquad (10a)$$

The calculated in-phase component value can be expanded as follows.

[Formula 10]

$$\begin{aligned} I_{measure}^{HT} &= IHT_l[Q_{measure}(l, NT)] \\ &= IHT_l[Q(l, NT)] + IHT_l[N_Q(l, NT)] \\ &= I(l, NT) + IHT_l[N_Q(l, NT)] \end{aligned} \qquad (10)$$

Here, IHT[*] is defined as an inverse Hilbert operator that advances the phase of each frequency component of * by 90 degrees. The subscript of the operator represents a variable with respect to which the operation is performed.

The estimation unit 53 performs the estimation procedure S03 for the in-phase component in the same manner.
The estimation unit 53 calculates an average value of the calculated in-phase component value of Expression (10a) and the actually measured in-phase component value $I_{measure}(l, nT)$ using Equation (11) to obtain an estimated in-phase component value.

[Formula 11]

$$I_{measure}^{new}(l, nT) = \qquad (11)$$

$$I(l, nT) + \frac{N_I(l, nT) + IHT_l[N_Q(l, nT)]}{2} = I(l, nT) + N_I^{new}(l, nT)$$

The standard deviation (Expression (11b)) of noise (Expression (11a)) which is given as the average of $N_I$ and $IHT_l[N_Q]$ has a magnitude of about $1/\sqrt{2}$ relative to the original standard deviation $\sigma$ of noise in the measurement of the in-phase component.

[Formula 11a]

$$N_I^{new} \qquad (11a)$$

[Formula 11b]

$$\sigma(N_I^{new}) \qquad (11b)$$

Using the estimated in-phase component value of Equation (11) and the estimated quadrature component value of Equation (9) that have been newly calculated, the phase of scattered light is calculated as follows.

[Formula 12]

$$\theta_{cal}^{new}(l, nT) = \operatorname{Arctan}\left[\frac{Q_{measure}^{new}(l, nT)}{I_{measure}^{new}(l, nT)}\right] = \operatorname{Arctan}\left[\frac{Q(l, nT) + N_Q^{new}(l, nT)}{I(l, nT) + N_I^{new}(l, nT)}\right] \qquad (12)$$

Figure 3:
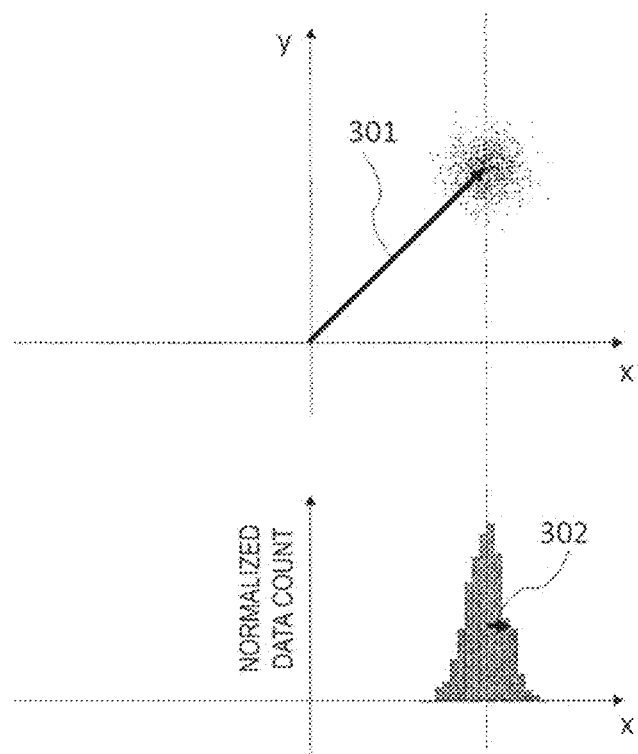
FIG. 3 is a diagram illustrating a phase calculation result of scattered light obtained through a phase measurement method according to the present invention.

The uncertainty of the phase of scattered light newly calculated using Equation (12) is smaller than the uncertainty of the phase of scattered light calculated using Equation (7). FIG. 3 illustrates, for example, estimated quadrature component values and estimated in-phase component values newly calculated using Equations (9) and (11) are plotted on the xy plane for a change with time at a certain 1 in a state where no vibration is applied to the optical fiber, similar to FIG. 2. The phase value at each time varies, but a vector 301, which indicates the center of the phase values, is given by the same Equation (7c) as the vector 201. However, the degree of variation of the vector 301 is about $1/\sqrt{2}$ smaller than that of the vector 201 in any direction. For example, the standard deviation 302 of the vector 301 in the direction of the x axis is about $1/\sqrt{2}$ times as much as the standard deviation 205 in FIG. 2.

For the calculation based on Equation (7), the uncertainty of the phase $\Delta\theta_{cal}(l, nT)$ can be evaluated as in Equation (13)

using the amplitude of the signal of Expression (13a) and the standard deviation σ in a certain direction if the amplitude is larger than the standard deviation.

[Formula 13a]

$$\sqrt{I^2(l, nT) + Q^2(l, nT)} \quad (13a)$$

[Formula 13]

$$\Delta\theta_{cal}(l, nT) = \text{Arctan}\left[\frac{\sigma}{\sqrt{I^2(l, nT) + Q^2(l, nT)}}\right] = \text{Arctan}\left[\frac{\sigma}{S}\right] \quad (13)$$

Here, S is the amplitude of the signal of Expression (13a).

For the calculation based on Equation (12), the uncertainty of the phase of Expression (14a) can be evaluated as in Equation (14).

[Formula 14a]

$$\Delta\theta_{cal}^{new}(l, nT) \quad (14a)$$

[Formula 14]

$$\Delta\theta_{cal}^{new}(l, nT) = \text{Arctan}\left[\frac{\sigma}{\sqrt{2}s}\right] \quad (14)$$

Thus, compared, when the wavelength of measurement is λ and the spatial resolution of the measurement is ΔL, to the method of calculating the phase from the output of the 90-degree optical hybrid using Equation (7), the amount of improvement D in the sensitivity of the amount of distortion by calculating the phase using Equation (12) is as follows.

[Formula 15]

$$D = \frac{\lambda[\Delta\theta_{cal}(l, nT) - \Delta\theta_{cal}^{new}(l, nT)]}{2\pi\Delta L} = \frac{\lambda\left[\text{Arctan}\left[\frac{\sigma}{S}\right] - \text{Arctan}\left[\frac{\sigma}{\sqrt{2}S}\right]\right]}{2\pi\Delta L} \quad (15)$$

Here, the amount of distortion is a dimensionless quantity representing the ratio of the amount of expansion and contraction of the optical fiber due to the physical vibration to the natural length of the optical fiber at each point, and units of ε are used to express the amount of distortion as a numerical value. For example, the amount of distortion is 1 µε when a certain part of an optical fiber has a natural length of 1 m and has been extended by 1 µm due to the physical vibration. The amount of improvement D in the sensitivity of the amount of distortion according to the present invention, for example, when the ratio S/σ of the amplitude of the signal to noise is 2, the wavelength is 1.55 µm, and the spatial resolution is 1 m, the amount of improvement D in the measurement sensitivity is about 30 nε.

A comparison between the uncertainty of the phase given by Equation (14) in the phase calculation method based on Equation (12) and the uncertainty of the phase when using the software-based processing mechanism using the Hilbert transform is described below. The software-based processing mechanism using the Hilbert transform can be implemented, for example, by causing the backscattered light from the circulator 5 in FIG. 1 and the local light obtained through splitting by the coupler 2 to be directly incident on the coupler 11 and detecting a signal 15 output from the balanced detector 13 as an in-phase component.

In this configuration, the number of times the backscattered light is split by couplers until reaching the balanced detector is reduced to 1 from 2 as compared with the configuration illustrated in FIG. 1. The intensity of the incident probe light has an upper limit to avoid a non-linear effect occurring in the fiber to be measured which interferes with the phase measurement. Therefore, in the software-based processing mechanism using the Hilbert transform, twice as much scattered light can be incident on the balanced detector as in the hardware-based processing mechanism using the 90-degree optical hybrid illustrated in FIG. 1. Thus, S in Equation (13) can be increased √2 times.

On the other hand, the local light can be adjusted such that a sufficient intensity is incident on the balanced detector even for the hardware-based processing mechanism using the 90-degree optical hybrid. Therefore, the uncertainty of the phase does not depend on the intensity of the local light because both σ and S in Equation (13) are proportional to the square root of the intensity of the local light. Thus, the uncertainty of the phase when using the software-based processing mechanism using the Hilbert transform and the uncertainty of the phase given by Equation (14) in the phase calculation method based on Equation (12) are the same.

Further, the averaging method based on Equations (9) and (11) described in the above example is effective in reducing not only the uncertainty of the phase of scattered light but also the uncertainty of the amplitude S of the signal of Expression (13a).

Second Embodiment

Because the phase values of scattered light calculated using Equations (7) and (12) have an uncertainty of an integer multiple of 2π, a method such as phase unwrapping described using Equation (4) is used to perform a procedure of removing the uncertainty of an integer multiple of 2π. However, in the phase unwrapping, there is a problem that an appropriate integer q is incorrectly selected due to the influence of noise and phase value differences of 2π or more which do not actually exist occur across points where the integer q is incorrectly selected. Use of the phase value calculated using Equation (12) can reduce the probability of occurrence of points where the integer q is incorrectly selected and solve such a problem because the uncertainty of the phase value calculated using Equation (12) is smaller than that of the phase value calculated using Equation (7). In the following description, the phase value of scattered light calculated using Equation (7) is referred to as a "related art phase value" and the phase value of scattered light calculated using Equation (12) is referred to as a "new phase value".

A specific example will be further described. The case where a periodic vibration is applied to the optical fiber during time intervals T such that the actual amount of change in phase is less than π radians will be considered. Values obtained by phase-unwrapping the related art phase value and the new phase value at a certain point l after a point where a vibration is applied are given by Expressions (16) and (17), respectively.

[Formula 16]

$$\theta_{cal}^{unwrap}(l, nT) \quad (16)$$

[Formula 17]

$$\theta_{cal}^{new, \, unwrap}(l, nT) \quad (17)$$

Figure 4:
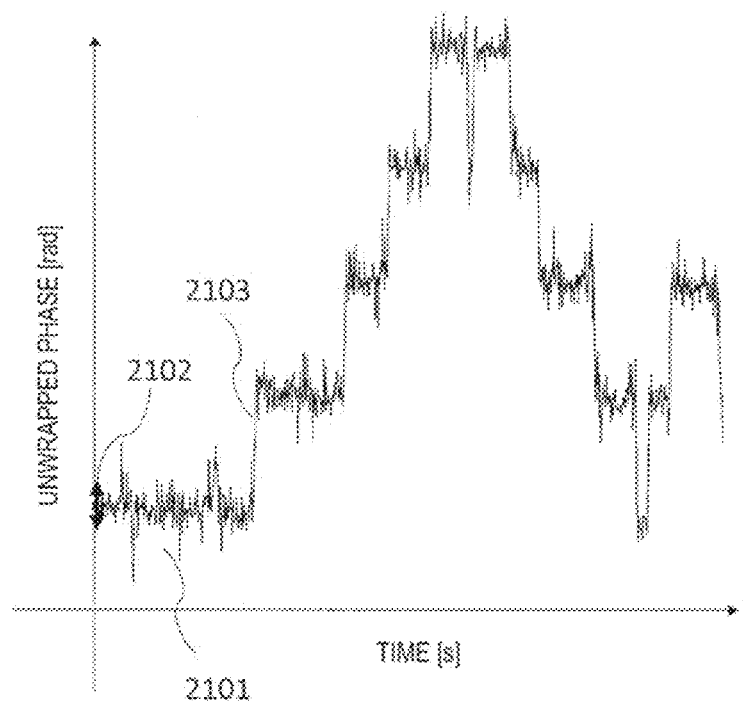
FIG. 4 is a diagram illustrating a result of performing phase unwrapping processing using the phase calculation result of scattered light obtained through the method of the related art.
Figure 5:
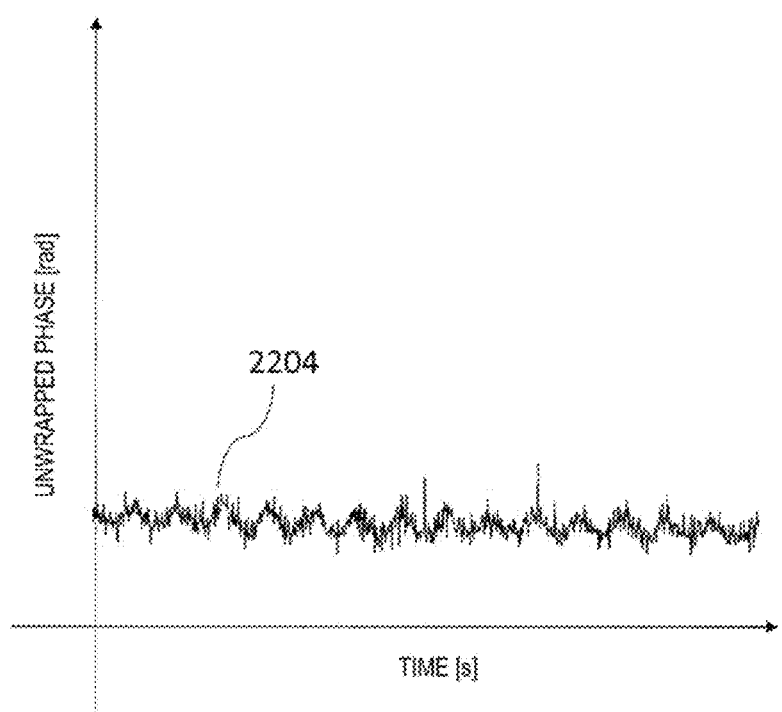
FIG. 5 is a diagram illustrating a result of performing phase unwrapping processing using the phase calculation result of scattered light obtained through the phase measurement method according to the present invention.

FIGS. 4 and 5 are graphs in which the values of Expressions (16) and (17) are plotted with time on the horizontal axis and phase on the vertical axis, respectively. In FIG. 4 which shows a result of performing phase unwrapping processing on the related art phase value, the phase changes with time as in a waveform 2101. Peak-to-peak values of the phase changing due to an actually applied vibration fall within a range of 2102. However, a plurality of points at which phase unwrapping fails occur like at a time indicated by 2103 due to the influence of noise. On the other hand, in FIG. 5 which shows a result of performing phase unwrapping processing on the new phase value, the phase changes with time as in a waveform 2204 and the number of points at which phase unwrapping fails can be reduced as the influence of noise is reduced.

The principle is described below. An ideal measured value of the phase in the absence of noise is simply referred to as $\theta(l, nT)$ below. This will also be simply referred to as $\theta(nT)$ by omitting the argument l representing the distance for the sake of simplicity. Phase unwrapping processing at time $(p+1)T$ will be considered assuming that phase unwrapping has been completed by time $pT$.

In an ideal case where there is no noise, Equation (19) is obtained because the phase $\theta((p+1)T)$ at time $(p+1)T$ satisfies Expression (18), assuming that phase changes between time intervals T are less than $\pi$ radians.

[Formula 18]

$$(2n+1)\pi > \theta((p+1)T) - \theta^{unwrap}(pT) > (2n-1)\pi \qquad (18)$$

Here, $\theta^{unwrap}(pT)$ is the unwrapped phase at time $pT$.

[Formula 19]

$$\theta^{unwrap}((p+1)T) = \theta((p+1)T) - 2n\pi \qquad (19)$$

However, because the calculated phase value, for example, $\theta_{cal}$, is affected by noise, phase unwrapping fails if m satisfying Expression (20) is different from n.

[Formula 20]

$$(2m+1)\pi \geq \theta_{cal}((p+1)T) - \theta_{cal}^{unwrap}(pT) \geq (2m-1)\pi \qquad (20)$$

Here, a condition in which m is different from n is given by Expressions (21).

[Formula 21]

$$[\theta_{cal}((p+1)T) - \theta((p+1)T)] - [\theta_{cal}^{unwrap}(pT) - \theta^{unwrap}(pT)] \geq (2n+1)\pi - [\theta((p+1)T) - \theta^{unwrap}(pT)]$$

or, $$[\theta_{cal}((p+1)T) - \theta((p+1)T)] - [\theta_{cal}^{unwrap}(pT) - \theta^{unwrap}(pT)] \leq (2n-1)\pi - [\theta((p+1)T) - \theta^{unwrap}(pT)] \qquad (21)$$

The probability that the condition of Expressions (21) are satisfied increases as the absolute value on the left sides of Expressions (21) increases if the amount of change in phase when the time changes from $pT$ to $(p+1)T$ is the same. The statistical averages of the values on the left sides of Expressions (21) are zero, but the statistical standard deviations thereof increase as the uncertainties of phases calculated at times $(p+1)T$ and $pT$ increase.

Thus, the use of the new phase value that has a smaller uncertainty than that of the related art phase value can reduce the probability of phase unwrapping failure.

Additional Description

The following is a description of the phase measurement method and the signal processing apparatus of the present invention.

Object

It is an object to enable offline measurement with a high SN ratio of the phase of scattered light of an optical fiber to be measured in an optical receiving system for real-time measurement (direct measurement).

Means (1): The present signal processing method uses a phase OTDR device that measures the phase of scattered light from a fiber to be measured with a configuration that performs coherent detection using a 90-degree optical hybrid and reduces the uncertainty of the phase through a method described below. First, the phase OTDR device directly measures an in-phase component and a quadrature component of a signal corresponding to scattered light. Next, a quadrature component calculated by Hilbert transforming the directly measured in-phase component and the directly measured quadrature component are averaged to generate a new quadrature component. Further, an in-phase component calculated by inverse Hilbert transforming the directly measured quadrature component and the directly measured in-phase component are averaged to generate a new in-phase component. Then, the generated new quadrature component is divided by the generated new in-phase component and a four-quadrant inverse tangent is applied to calculate a phase. This method can reduce the uncertainty of the phase compared to that of a phase calculated by dividing the directly measured quadrature component by the directly measured in-phase component and applying a four-quadrant inverse tangent.

(2): The present measurement apparatus includes a laser light source that outputs continuous light, an element that splits the laser light source into local light and probe light, an element that causes the probe light to be incident on an optical fiber to be measured, a 90-degree optical hybrid that receives backscattered light of the probe light from the optical fiber to be measured and the local light as inputs, a balanced detector that receives two outputs on the in-phase component side of the 90-degree optical hybrid and obtains an electrical signal of the in-phase component, a balanced detector that receives two outputs on the quadrature component side of the 90-degree optical hybrid and obtains an electrical signal of the quadrature component, and a signal processing unit that processes the electrical signals of the in-phase and quadrature components output from the two balanced detectors, and obtains the phase of scattered light at each point in a longitudinal direction of the optical fiber to be measured through calculation of the signal processing unit and performs the signal processing of the above (1).

(3): The phase is calculated through the signal processing method of the above (1) and phase unwrapping processing is performed on the calculated phase, thereby reducing the probability of incorrect phase unwrapping compared to when phase unwrapping is performed on a phase calculated by dividing the directly measured quadrature component by the directly measured in-phase component and applying a four-quadrant inverse tangent.

Effects

The present invention enables measurement having a high SN ratio by offline processing through signal processing even when a hardware-based processing mechanism using a 90-degree optical hybrid is used for a receiving system in a C-OTDR. Therefore, both real-time measurement and measurement having a high SN ratio by offline processing can be achieved by a single hardware-based processing mechanism using a 90-degree optical hybrid.

The present invention is not limited to the above embodiments as they are, but the components can be modified and embodied without departing from the spirit of the invention at an implementation stage. The signal processing apparatus of the present invention can also be implemented by a computer and a program and the program can be recorded on a recording medium or provided through a network.

REFERENCE SIGNS LIST

1 CW light source
2 Coupler
3 Intensity modulator
4 Frequency shifter
5 Circulator
6 Optical fiber to be measured
7 90-degree optical hybrid
8 Coupler
9 Coupler
10 Phase shifter
11 Coupler
12 Coupler
13 Balanced detector
14 Balanced detector
15 Electrical signal
16 Electrical signal
17 Signal processing apparatus
17a AD conversion functional element
17b AD conversion functional element
17c Signal processing unit

The invention claimed is:

1. A phase measurement method for measuring a phase of scattered light from a fiber to be measured, the phase measurement method comprising:
splitting continuous light of a single wavelength into two beams;
changing a frequency of one of the two split beams of the continuous light;
pulsing one light beam of the two split beams of the continuous light to be input to the fiber to be measured;
inputting the scattered light from the fiber to be measured, and inputting the other light beam of the two split beams of the continuous light as local light, to a 90-degree optical hybrid;
acquiring a measured in-phase component value and a measured quadrature component value of a signal obtained by coherently detecting with the scattered light and the local light through the 90-degree optical hybrid;
Hilbert transforming the measured in-phase component value to acquire a calculated quadrature component value and inverse Hilbert transforming the measured quadrature component value to acquire a calculated in-phase component value;
averaging the measured in-phase component value and the calculated in-phase component value to acquire an estimated in-phase component value and averaging the measured quadrature component value and the calculated quadrature component value to acquire an estimated quadrature component value; and
calculating a four-quadrant inverse tangent of a quotient obtained by dividing the estimated quadrature component value by the estimated in-phase component value.

2. The phase measurement method according to claim 1, further comprising performing phase unwrapping processing on the four-quadrant inverse tangent.

3. A phase measurement apparatus comprising:
a light source configured to output continuous light of a single wavelength;
a coupler configured to split the continuous light into two beams;
a frequency shifter configured to change a frequency of one light beam of the two split beams of the continuous light;
an intensity modulator configured to pulse the one light beam of the two split beams of the continuous light to be input to a fiber to be measured;
a 90-degree optical hybrid configured to receive scattered light from the fiber to be measured, and to receive the other light beam of the two split beams of the continuous light as local light;
a balanced detector configured to acquire a measured in-phase component value and a measured quadrature component value of a signal obtained by coherently detecting with the scattered light and the local light through the 90-degree optical hybrid, and
a signal processing apparatus,
the signal processing apparatus comprising:
a signal input unit configured to receive, as inputs, the measured in-phase component value and the measured quadrature component value from the balanced detector;
a transform unit configured to Hilbert transform the measured in-phase component value to acquire a calculated quadrature component value and inverse Hilbert transform the measured quadrature component value to acquire a calculated in-phase component value;
an estimation unit configured to average the measured in-phase component value and the calculated in-phase component value to acquire an estimated in-phase component value and average the measured quadrature component value and the calculated quadrature component value to acquire an estimated quadrature component value; and
a calculation unit configured to calculate a four-quadrant inverse tangent of a quotient obtained by dividing the estimated quadrature component value by the estimated in-phase component value.

4. The phase measurement apparatus according to claim 3, further comprising a phase unwrapping processing unit configured to perform phase unwrapping processing on the four-quadrant inverse tangent.

5. A non-transitory computer-readable storage medium storing a program for causing a computer to operate as the signal processing apparatus of the phase measurement apparatus according to claim 3.

* * * * *